P. D. JOHNSON.
OIL BURNER.
APPLICATION FILED JUNE 19, 1916.

1,225,718.

Patented May 8, 1917.
5 SHEETS—SHEET 1.

Inventor
Philip D Johnson
By Brown, Hanson & Poetcher
Attorneys

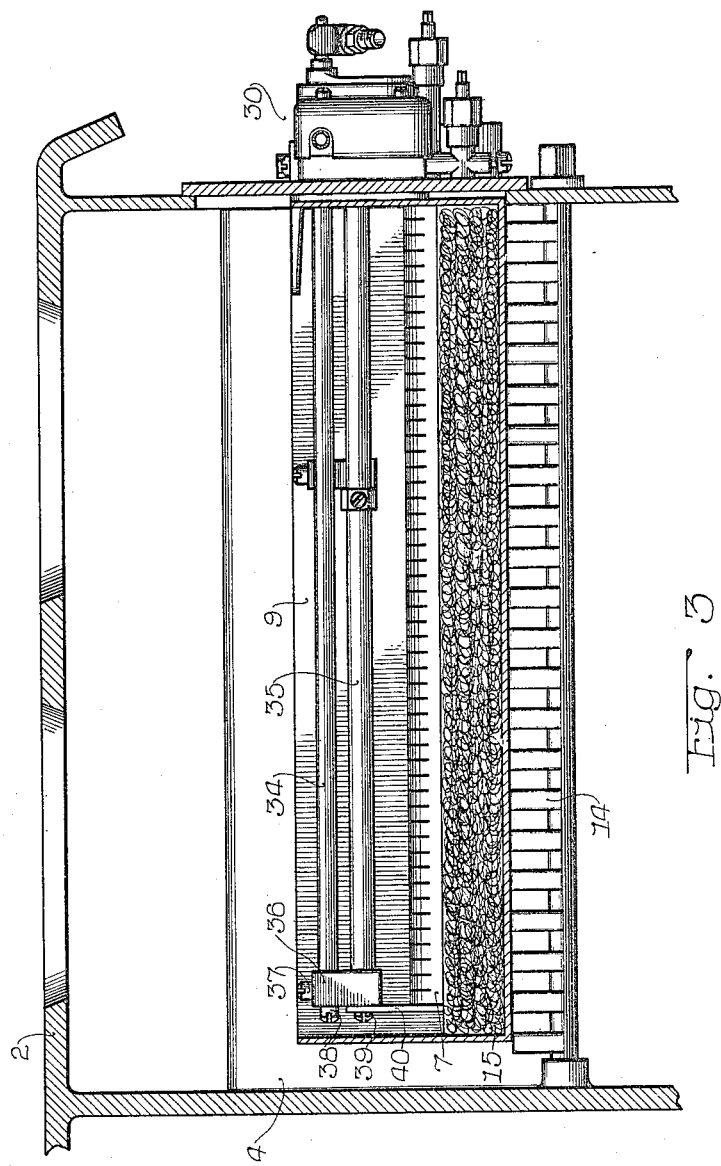

P. D. JOHNSON.
OIL BURNER.
APPLICATION FILED JUNE 19, 1916.
1,225,718.
Patented May 8, 1917.
5 SHEETS—SHEET 3.
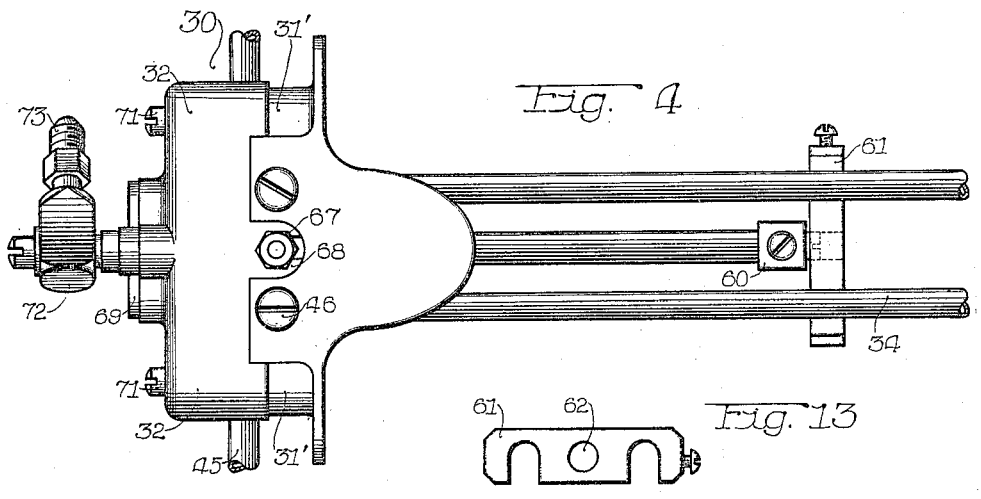
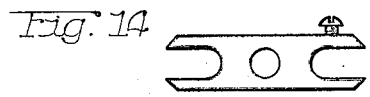
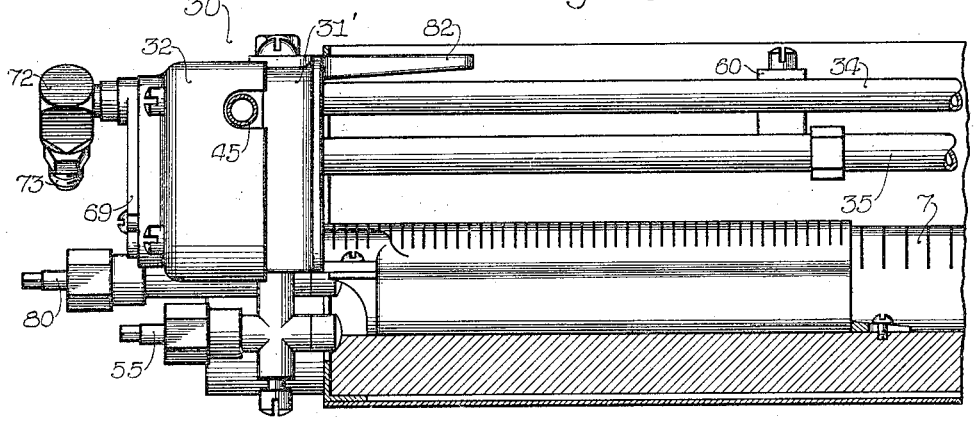
Inventor
Philip D Johnson
By Brown, Hanson & Boettcher
Attorneys

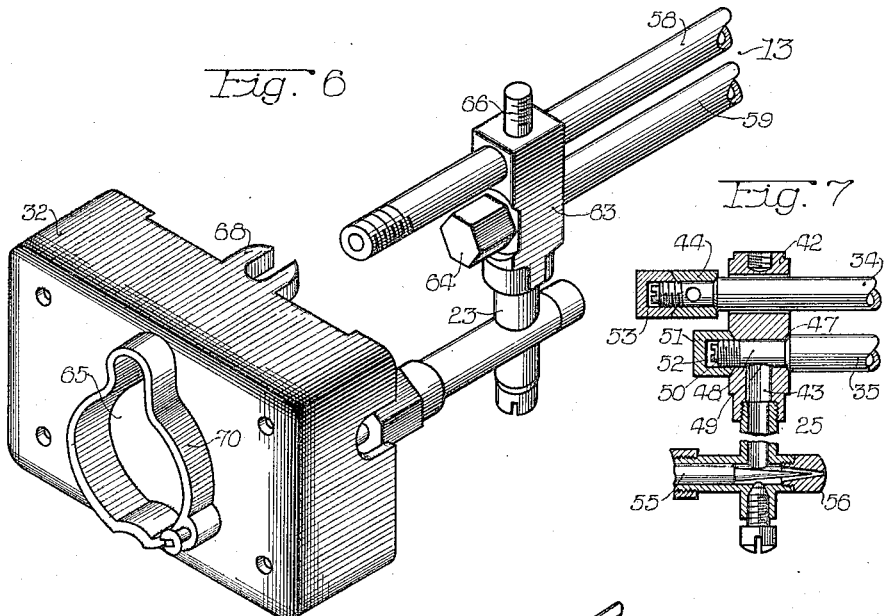
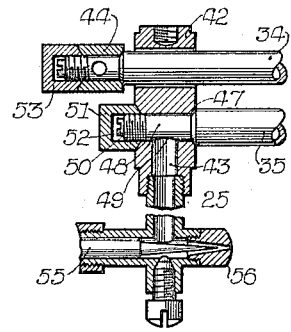
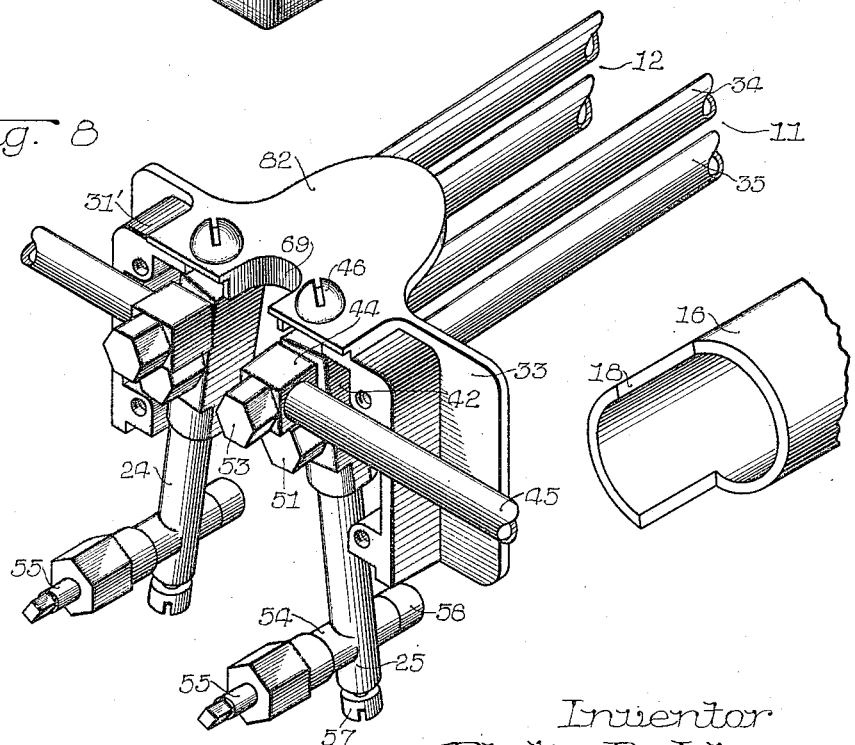

P. D. JOHNSON.
OIL BURNER.
APPLICATION FILED JUNE 19, 1916.

1,225,718.

Patented May 8, 1917.
5 SHEETS—SHEET 5.

Inventor
Philip D Johnson
By Brown, Hanson & Boettche
Attorneys

UNITED STATES PATENT OFFICE.

PHILIP D. JOHNSON, OF CHICAGO, ILLINOIS, ASSIGNOR OF ONE-HALF TO CHARLES A. BROWN, OF HINSDALE, ILLINOIS.

OIL-BURNER.

1,225,718.     Specification of Letters Patent.     Patented May 8, 1917.

Application filed June 19, 1916. Serial No. 104,358.

*To all whom it may concern:*

Be it known that I, PHILIP D. JOHNSON, citizen of the United States, residing at Chicago, in the county of Cook and State of Illinois, have invented a certain new and useful Improvement in Oil-Burners, of which the following is a full, clear, concise, and exact description, reference being had to the accompanying drawings, forming a part of this specification.

My invention relates to oil burners.

The particular burner which I shall describe and illustrate is designed particularly as an attachment for a kitchen stove or range or the like, though it is not to be confined solely to such use.

For various reasons it is often desirable to operate kitchen stoves, ranges and the like which have previously been fired with wood or coal, by using oil as a fuel. The general cleanliness, convenience and ease of control of oil burners as compared with burners for coal, wood and the like and the constancy of the heat obtainable form advantages so marked that there is a demand for a suitable oil burner which may be inserted in the fire box of a common kitchen stove or range so as to be applicable to stoves already in the hands of the user and to form a substitute for the burning of coal, wood or the like or to be used interchangeably in structures of this class.

My invention aims to provide an improved oil burner to supply the above demand.

The invention consists in an improved arrangement of parts to form a unitary structure which may be inserted or withdrawn bodily, thereby requiring a minimum of labor in changing from coal or wood burning to oil burning or vice versa. The device is further characterized by reliability, ease and flexibility in operation and simplicity of construction and ease of repair.

The device which I shall specifically describe and illustrate in connection with the accompanying drawings consists of two separate main burners and a pilot burner. I am able to secure a wide range of heating by proper control of these burners.

In the drawings—

Fig. 3 is a longitudinal section inside of the casing of the burner, showing also the grate and a part of the adjacent stove structure;

Fig. 4 is a plan view with parts broken away of the main vaporizers and the pilot vaporizer, showing also the outside housing and the attachment for the different parts;

Fig. 5 is an enlarged longitudinal sectional view similar to the view of Fig. 3, the section being taken through the center of the main burner casting;

Fig. 6 is an isometric view of the outer part of the housing and the adjacent end of the pilot vaporizer;

Fig. 7 is a cross-sectional view showing the interior connection of the pilot vaporizer;

Fig. 8 is an isometric view of the inner half of the housing and the adjacent end of the main vaporizer;

Fig. 13 is an elevation of the bridge block, and

Fig. 14 is an elevation of a modified form of bridge block.

Figure 1:
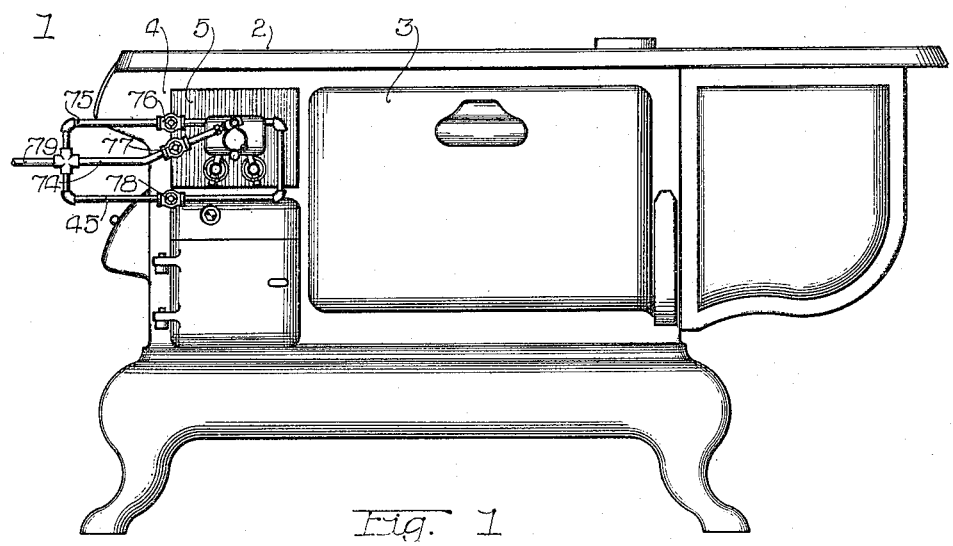
Figure 1 is a side elevation of a stove provided with a structure embodying my invention.
Figure 9:
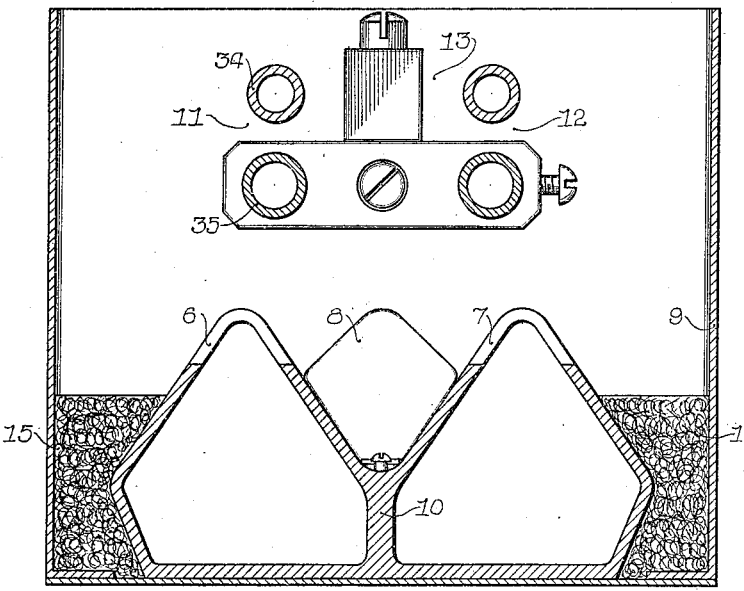
Fig. 9 is a transverse cross-section, looking toward the front.

The oil burner which I have illustrated is applicable in any connection in which it may be found suitable, but is particularly designed for insertion in the fire-box of the usual kitchen stove or range, as is illustrated in Fig. 1. The stove 1 is provided with the usual top 2, this top being provided with suitable holes for cooking purposes as is well understood in the art. The stove also comprises the oven portion 3 which is heated by the heat generated in the fire-pot 4. When the burner of my invention is inserted in the fire-pot 4 the open end of the fire-pot may be closed by a suitable plate 5 which may be substituted for the usual door or may in fact be formed by said door, as desired. The function of the plate 5 is to close the opened outer end of the fire-pot.

Two main burners 6 and 7 and a pilot burner 8 are mounted within a suitable casing 9 and disposed within the fire-pot 4. The main burners 6 and 7 are preferably formed of a single casting having a separating wall 10 between them to render the operation of each burner independent of the other. Each of the main burners 6 and 7 are provided with individual vaporizers 11 and 12, respectively. The pilot burner 8 is also provided with a vaporizer 13. In each case the vaporizer is placed above the corresponding burner. The casing 9 is prismatic and open at the top and is of suitable size and proportion to be disposed within the fire-pot 4 and to rest upon the grate 14. (See Fig. 3.) The main burners 6 and 7 are located in the bottom of the casing 9 and the space between the sides of the burners and the sides of the casing may be filled with asbestos packing 15, or similar material. The sides of the casing 9 extend up to a point above the main and the pilot burner to form a fire box and for the purpose of preventing drafts and the like from blowing the flames from these burners away from their proper positions. It is obvious, however, that the casing 9 made be made of any desired height and that the casing itself is not absolutely essential to the operation of the burner, although it is conducive to proper operation of the same. The main burners 6 and 7 are provided with proper mixing tubes 16 and 17 which are preferably formed, as shown at the right of Fig. 8, having each an extending lip 18 to prevent the main burners from robbing the pilot burner of the proper air supply.

Figure 2:
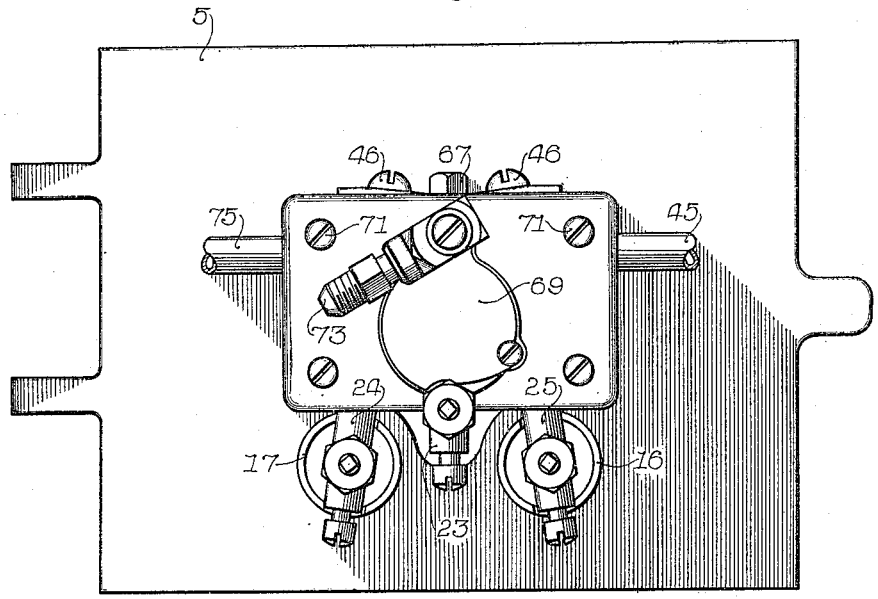
Fig. 2 is an enlarged front elevation of the attachment which is shown in place in Fig. 1.

The pilot burner 8 comprises a separate casting which is laid in the groove or valley between the main burners 6 and 7 and is provided at its inner end with a split lug 19 which is adapted to be held by a screw 20 fastened in the metal of the main burners 6 and 7. The outer end of the pilot burner 8 is formed with burner extensions 21 and 22 which extend upon opposite sides of the pilot burner nozzle 23 (see Figs. 2 and 6) and between said pilot burner nozzle 23 and the main burner nozzles 24 and 25. Suitable wings or lateral extensions 26 and 27 are formed on the pilot burner casting 8 and these wings form a closure for the bottom of the housing 30, shown more particularly in Fig. 8. A suitable mixing tube 31 projects into the pilot burner casting 8 and communicates at its outer end with the atmosphere.

The housing 30 comprises an inner or base portion 31' and an outer or cap portion 32. (See Figs. 6 and 8.) The base portion of the housing is provided with a suitable flange 33 for connection with the plate 5. It is apparent that the plate 5 may be dispensed with and the flange 33 extended in order to form a suitable closure for the outer end of the fire box 4. The main burner vaporizers 11 and 12 and their corresponding nozzles 25 and 24 are mounted in and secured to the base portion 31' of the housing 30.

The main vaporizers are alike in all respects except that one is for the right side and the other is for the left side. A description of the vaporizer 11 and its cooperating parts, particularly in connection with Fig. 7, will suffice to make clear the construction of both. The vaporizer 11 comprises a pair of tubes 34 and 35 which are connected together at their inner ends by a suitable connecting block 36. The block 36 is bored to provide a passage between the pipes 34 and 35. A suitable screw 37 communicates with the transverse portion of the passage in block 36 and the screws 38 and 39 are connected directly in line with the tubes 34 and 35 and provide cleaning passages for said tubes. A plate 40 is secured to the ends of the main burners 6 and 7 and projects upwardly into a position suitable to support the inner end of both of the main vaporizers. Suitable sockets or openings are provided in the upper part of the plate 40 and the screws 39 project into the sockets or openings to provide supports for the inner ends of the vaporizers.

At their outer ends the tubes 34 and 35 are connected mechanically by a suitable block 42. The block 42 is provided with an interior communicating passage 43 which forms a connection between the tube 35 and the nozzle 25. The tube 34 is connected at its outer end to the connecting block or union 44 that joins the tube 34 to the oil supply pipe 45. A passage is formed through the top of the block 42 of a size sufficient to allow the tube 34 to pass therethrough freely. A screw or bolt 46 passing through the top of the housing section 31' is threaded into the top of the block 42 to suspend the same from the top of the housing. It can now be seen that the vaporizer forms a sort of loop or U-shaped passage between the oil supply pipe 45 and the nozzle 25. The tubes 34, 35, form the sides or legs of the U; the connecting block at the inner end 36 forms the bottom of the U; the oil supply pipe 45 being connected to the one leg 34 and the nozzle 25 being connected to the other leg 35. Inasmuch as the tube 34 contains relatively cold oil and the tube 35 contains relatively hot vapor the amount of expansion due to heating will be unequal in these two tubes. Provision is made for this in having the tube 34 lie loosely in the block 42. Sufficient space is provided at the inner end of the vaporizer between the plate 40 and the connecting block 36 to permit the expansion of the tube 35 to be taken up in this direction and sufficient space is provided between the block 44 and the block 42 to permit the necessary amount of play between these parts. This prevents bowing or buckling of the vaporizer tubes and tends to maintain them in good condition through long periods of operation.

The connection between the tube 35 and the block 42 is formed by turning down and threading the outer end of the tube 35, as shown in Fig. 7, to form the shoulder 47 that seats against a corresponding seat in the block 42. The portion of reduced diameter 48 fits snugly within a corresponding opening in the block 42 and this reduced portion is provided with a passage 49 which communicates with the passage 43 in the block 42.

The extreme outer end of the tube 35 is threaded as shown at 50 and is provided with a cap nut 51 which forms a tapered joint against the corresponding seat in the block 42. The end of the tube 35 is preferably plugged as by means of the screw plug 52.

The pipe 34 is joined to the connecting block 44 in a similar manner, the parts being held together by means of the cap nuts 53.

The nozzle 25 is provided with a portion 54 extending at right angles to the main body, this right angle portion 54 being formed to provide suitable housings for the valve stem 55 which coöperates with a removable tip 56 to form a valve which regulates the height of the flame on the particular burner. A suitable screw 57 is provided in line with the passage 43 at the bottom of the nozzle.

The construction of the vaporizer 12 and connected parts is similar to that above described.

The construction of the pilot vaporizer 13 is substantially the same as described in connection with the vaporizer 11. The vaporizer 13 comprises the tubes 58 and 59 which are joined at their inner ends by the block 60. The block 60 is preferably provided with a suitable cleaning screw. A bridge block 61 which connects the tubes 35 of the vaporizers 11 and 12 is provided with an aperture 62 in such position as to engage the cleaning screw in line with the pipe 59 to support the inner end of the pilot vaporizing device in proper position as shown in Figs. 4 and 5. The block 61 is preferably adjustable along the tubes 35 and may be formed as shown in Fig. 14 to be readily removable to permit the withdrawal of one main vaporizer without disturbing the other.

The outer end of the pipe 59 is joined to the block 63 by means of the cap nut 64. A suitable passage in the block 63 provides communication between the pipe 59 and the nozzle 23. The pipe 58 passes loosely through the block 63 and projects through the top of the opening 65 formed in the front half of the housing 30. The top of the block 63 is provided with a stud 66 which is secured by means of the nut 67 in the split lug 68 which projects into the corresponding recess 69 formed in the top of the housing section 31′. A sliding cover 69, hung upon the upper tube 58, normally closes the opening 65. A suitable flange 70 surrounds the opening 65 in order to space the cover 69 from the body of the cap 32. The cap 32 is held to the base 31′ by means of suitable screws 71 and as the pilot vaporizer in connected to the cap 32 by means of the stud 66, it is possible by releasing the screws 71 to remove the pilot vaporizer completely without disturbing the main burners. The outer end of the pipe 58 is connected to a connecting block 72 which is joined by a suitable union 73 to an oil supply pipe 74. Suitable means such as a pipe 79 which is connected to a reservoir, supplies the main burners and the pilot burner, respectively, through the pipes 45, 75 and 74, respectively. Suitable valves, 76, 77 and 78, are provided for turning on the oil to the vaporizer prior to lighting the main burners. The needle valves 55 with which the nozzles 24 and 25 are provided, are for the purpose of regulating the height of the flame. These needle valves are not employed for turning on and off these burners, this function being performed by the valves 76 and 78. In a similar manner, the oil supply to the pilot vaporizer and burner is controlled through the valve 77, the height of the pilot flames being regulated by a suitable needle valve 80 (see Fig. 5).

The burner extensions 21 and 22 of the pilot burner 8 maintain the block 42 of the main vaporizer hot at all times, while the pilot burner is operating and also keep the pilot vaporizing block 63 in the same condition. As an additional means for supplying heat which is lost by radiation, the base 31′ of the housing 30 is provided with an integral tongue 82 which projects for a short distance over the pilot and main burners.

The operation of the burner is as follows:

The entire burner with front plate attached is inserted into the firebox of the stove with the front plate closing the open end of the firebox. Oil is supplied through the supply pipe 79 under gravity head or other suitable means for producing sufficient pressure to force the fuel through the vaporizer and out of the nozzle. It is necessary to heat the pilot vaporizer from exterior means preparatory to first lighting the same. Thereafter the pilot burner keeps both its own vaporizer and both of the main vaporizers hot. The pilot burner is turned as low as will maintain the vaporizer hot by means of the needle valve 80. If a moderate amount of heat is desired less than that given off by one of the main burners, the pilot burner may be turned up by opening the needle valve 80 so as to increase the amount of flame at the pilot burner. When a greater amount of heat is desired, one of the main burners 6, 7 is put into operation by opening the corresponding valves 78 or 76, the height of the flame being regulable by means of the corresponding needle valve 55. When an amount of heat greater than can be furnished by one of the burners is required, both of the burners may be turned on, and suitably regulated to furnish the exact amount of heat required.

It can be seen from the above that the operation, control and regulation is characterized by ease and simplicity.

Figure 10:
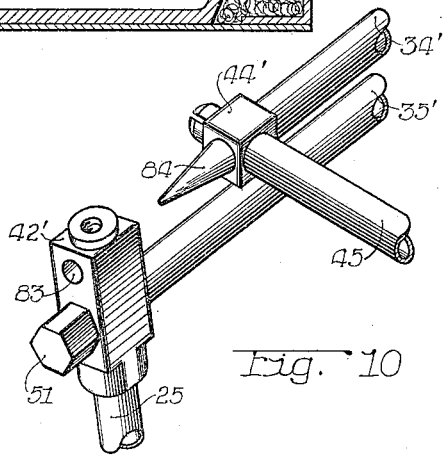
Fig. 10 is an isometric view of a modification of the main vaporizer.
Figure 11:
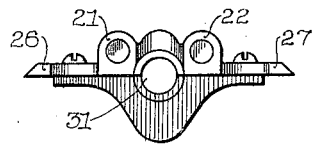
Fig. 11 is a front end elevation of the pilot burner casting.
Figure 12:
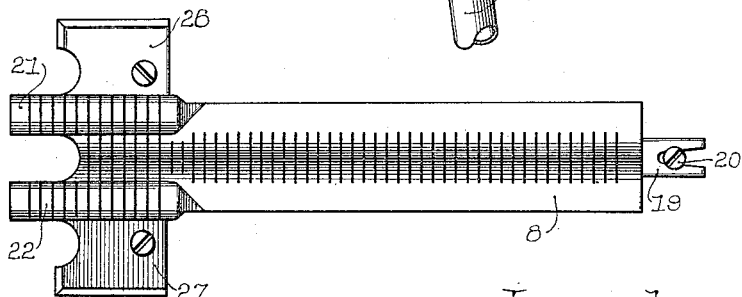
Fig. 12 is a plan view of the same.

In Fig. 10 I have shown a modified form of supporting block 42' for connecting the outer ends of the vaporizer tubes 34' and 35'. The block 42' is provided with a transverse passage 83 for supporting the tube 34'. The tube 34' does not pass through the passage 83 but stops short of the connecting block 42', being connected to the oil pipe 45 by means of the block 44'. The block 44' is provided with a tapered pin 84 which closes an opening axially in line with the tube 34' or if desired may be formed integral with the block 44', to project into the opening 83 and support the outer end of the tube 34'. The tube 35' is connected to the nozzle 25 in the same manner as illustrated in detail in Fig. 7. The block 42' is supported by means of a suitable screw bolt threaded into the upper end of the block.

What I claim is:

1. In combination a pilot burner having a separate vaporizer and a plurality of independently operable main burners having separate vaporizers, said main burners and said pilot burner being so organized that said pilot burner conditions said main vaporizers for operation at all times, means for supplying liquid fuel to all of said vaporizers and means for individually turning on or off all of said burners independently.

2. In combination a prismatic hollow casing having an open top, a main oil burner located in said casing, a pilot burner for said main burner, a front plate secured to said casing, said front plate forming a flange extending beyond the sides of said casing, a housing projecting upon the outside of said front plate, and a vaporizer for said liquid fuel burner projecting into said housing, said housing comprising a base portion and a cap portion, said pilot burner being removable by removing said cap portion.

3. In combination a burner casting having pair of perforated ridges to form burners, a wall dividing said casting into two separate chambers to form independent burners, individual vaporizers above said burners, regulating means for controlling the height of flame of each burner individually and independent valve means controlling the off and on position of each burner.

4. In combination a burner casting having pair of perforated ridges, a wall between said ridges to form independent passages or chambers for two separate burners, an individual vaporizer for each of said burners, a pilot burner disposed between said main burners and adapted to condition said main vaporizers for operation, a pilot vaporizer above said pilot burner, means for regulating the flame of each main burner, means for regulating the flame of the pilot burner and valve means for shutting off each of the main burners.

5. In combination a main burner casting having a plate or bracket at its rear end projecting vertically, a socket in said vertical plate, a pair of vaporizing tubes arranged one above the other, a connecting block at the inner ends of said vaporizing tubes, said block having a projecting member in line with the lower one of said vaporizing tubes adapted to lie in said socket, a second connecting block for mechanically connecting the vaporizing tubes, a housing for supporting said second block and a nozzle secured to and communicating with the lower vaporizing tube through said latter block.

6. In combination a burner casting having an upwardly extending bracket or plate at its rear end, said bracket of plate having a socket therein, a pair of vaporizing tubes, a connecting block for connecting the inner ends of said tubes together, said block having a communicating passage therein for said tubes, a projection on said block adapted to coöperate with the socket in said bracket or plate on the rear end of the burner casting, a housing connected to the front end of said burner casting, a supporting block having a passage communicating with the lower of said vaporizing tubes, and having means for loosely supporting the upper vaporizing tube, means for securing said latter block removably in said housing, and an oil supply pipe connected to said upper tube.

7. In a burner, a burner casting, a housing secured to said casting, said housing comprising a base portion and a cap portion, a block secured to said base portion, a nozzle secured to said block, a vaporizing tube secured to said block and communicating with said nozzle through said block, a second vaporizing tube above said first vaporizing tube, said second tube being loosely secured to said block to permit of relative movement therewith due to differences in expansion of said tubes, and an oil supply pipe connected at right angles to said upper tube, said cap being removable independently of said oil supply pipe or said vaporizing tube.

8. In combination a pair of main burners having vaporizers, a housing secured to said main burners, said housing comprising a base portion and a cap portion, connecting blocks for said vaporizers secured to said base portion, a pilot burner adapted to lie between said main burners, a pilot vaporizer, said pilot vaporizer having a connecting block secured to the cap portion of said housing and means for supporting said pilot vaporizer over the pilot burner, said cap portion of the housing being removed with the pilot vaporizer independently of the base portion of the housing and the main vaporizer.

9. In combination a main burner casting, said casting being hollow and having two ridges with burner slits, said ridges having a groove between them, said casting having an imperforate median wall forming two independent mixing chambers and two independent burners, a casing about said casting for defining a fire-box, independent vaporizers for each of said burners, a pilot burner casting secured in the groove between said main burners, an independent vaporizer for said pilot burner, means for supplying oil and valve means for shutting off or turning on each burner individually.

In witness whereof, I hereunto subscribe my name this 17th day of June, A. D. 1916.

PHILIP D. JOHNSON.

Copies of this patent may be obtained for five cents each, by addressing the "Commissioner of Patents, Washington, D. C."